(12) United States Patent
Bruce

(10) Patent No.: US 7,207,770 B2
(45) Date of Patent: *Apr. 24, 2007

(54) VARIABLE STATOR VANE BUSHINGS AND WASHERS

(75) Inventor: Robert William Bruce, Loveland, OH (US)

(73) Assignee: General Electric Company, Schenectady, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 11/207,921

(22) Filed: Aug. 19, 2005

(65) Prior Publication Data

US 2005/0276686 A1    Dec. 15, 2005

Related U.S. Application Data

(63) Continuation-in-part of application No. 10/445,428, filed on May 27, 2003, now Pat. No. 7,094,022.

(51) Int. Cl.
*F01D 17/16* (2006.01)

(52) U.S. Cl. ..................................... 415/160
(58) Field of Classification Search ................ 415/160, 415/200
See application file for complete search history.

(56) References Cited

U.S. PATENT DOCUMENTS

| | | |
|---|---|---|
| 3,711,171 A | 1/1973 | Orkin et al. |
| 3,873,168 A | 3/1975 | Viola et al. |
| 4,163,364 A | 8/1979 | Shirato et al. |
| 5,536,022 A | 7/1996 | Sileo et al. |
| 5,622,473 A | 4/1997 | Payling |
| 5,807,072 A | 9/1998 | Payling |
| 6,086,327 A | 7/2000 | Mack et al. |
| 6,139,261 A | 10/2000 | Bishop et al. |
| 6,146,093 A | 11/2000 | Lammas et al. |
| 6,170,990 B1 | 1/2001 | Hawkins |
| 6,184,333 B1 | 2/2001 | Gray |
| 6,264,369 B1 | 7/2001 | Mesing et al. |
| 6,474,941 B2 | 11/2002 | Dingwell et al. |
| 6,481,960 B2 | 11/2002 | Bowen |
| 7,094,022 B2 * | 8/2006 | Bruce .......................... 415/160 |
| 2001/0016091 A1 | 8/2001 | Mesing et al. |
| 2001/0022934 A1 | 9/2001 | Mashey |
| 2002/0071760 A1 | 6/2002 | Dingwell et al. |
| 2002/0154991 A1 * | 10/2002 | Bowen ........................ 415/160 |
| 2004/0052636 A1 * | 3/2004 | Schilling et al. ............ 415/160 |

* cited by examiner

*Primary Examiner*—Richard A. Edgar
(74) *Attorney, Agent, or Firm*—McNees Wallace & Nurick LLC

(57) ABSTRACT

Materials, heretofore unknown for use in bearing assemblies, which produce equal or better wear resistance at reduced materials cost have been identified. These alternatives fall into four general categories: solid materials from which bushings and washers can be fabricated, coatings bonded to metallic vanes to minimize total system wear, solid lubricant coatings placed on any bushing or vane stem to reduce friction, and porous ceramic material from which seals can be fabricated.

32 Claims, 5 Drawing Sheets

VARIABLE STATOR VANE BUSHINGS AND WASHERS

CROSS-REFERENCE TO RELATED APPLICATIONS

This application is a Continuation-in-Part of U.S. patent application Ser. No. 10/445,428, filed May 27, 2003 now U.S. Pat. No. 7,094,022, which is herein incorporated by reference in its entirety.

FIELD OF THE INVENTION

This invention relates generally to components of gas turbine engines and, in particular, to variable stator vane bushings and washers systems used in the compressor section of the engine.

BACKGROUND OF THE INVENTION

In gas turbine engines, for example, aircraft engines, air is drawn into the front of the engine, compressed by a shaft-mounted rotary compressor, and mixed with fuel. The mixture is burned, and the hot exhaust gases are passed through a turbine mounted on a shaft. The flow of gas turns the turbine, which turns the shaft and drives the compressor. The hot exhaust gases flow from the back of the engine, providing thrust that propels the aircraft forward.

Gas turbine engines generally include a high pressure compressor, a combustor, and a high pressure turbine. The high pressure compressor, combustor, and high pressure turbine are sometimes collectively referred to as a core engine. Such gas turbine engines also may include a low pressure compressor for supplying compressed air, for further compression, to the high pressure compressor, and a fan for supplying air to the low pressure compressor.

The high pressure compressor typically includes a rotor surrounded by a casing. The casing is typically fabricated to be removable, such as by forming the casing into two halves that are then removably joined together. The high pressure compressor includes a plurality of stages and each stage includes a row of rotor blades and a row of stator vanes. The casing supports the stator vanes, and the rotor supports the rotor blades. The stator vane rows are between the rotor blade rows and direct air flow toward a downstream rotor blade row.

To improve the overall operation of the compressor, several compressor stator vanes are rotatively mounted to allow each vane to rotate around its longitudinal axis (which extends in a radial direction from the centerline of the engine) to adjust the angular orientation of the vane relative to the airflow through the compressor. These variable stator vane assemblies are utilized to control the amount of air flowing through the compressor to optimize performance of the compressor. Each variable stator vane assembly includes a variable stator vane which extends between adjacent rotor blades. The orientation of the variable stator vane affects air flow through the compressor. A lever arm is fixedly joined to the vane stem extending outwardly from the vane bushing. The distal end of the lever arm is operatively joined to an actuation ring that controls the orientation of the vane. All of the vane lever arms in a single row may be joined to a common actuation ring for ensuring that all of the variable vanes are simultaneously positioned relative to the airflow in the compressor stage at the same angular orientation.

A known variable vane assembly includes a variable vane; a trunnion seal, for example, a bushing; and a washer. The variable vane assembly is bolted onto a high pressure compressor stator casing and the bushing and washer surround an opening that extends through the casing. The variable vane includes a vane stem that extends through the opening in the casing and through the bushing and washer. The bushing and washer are referred to herein as a bearing assembly. The bearing assembly produces a low friction surface that prevents metal on metal contact between the vane stem and the casing. Such variable vane assemblies have possible air leakage pathways through the openings in the casing. Also, the high velocity and high temperature air causes oxidation and erosion of the bearing assembly, which may accelerate deterioration of the bearing assembly, lead to failure of the bearing assembly, and eventual failure of the variable vane assembly.

Once the bearing assembly fails, an increase in leakage through the opening occurs, which results in a performance loss for the compressor. In addition, failure of the bearing assembly may result in contact between the stator vane and the casing, which causes wear and increases overhaul costs of the engine.

During operation, a gas turbine engine experiences a variety of forces within the engine that affect the bearing structures. For example, during a stall condition, forces on the vane assembly go through a reversal of direction, locally bending the case material that supports the bearing assembly. Such localized bending may result in strain and potential breakage of bearing components, particularly the bushing. High temperature or ceramic bearing materials have an elastic modulus that is much greater than the materials within the vane assembly. The result of the bearing assembly having a much greater elastic modulus is that the bushing and washer are less able to elastically deform with the case, due to the relative stiffness of the bushing/washer material. Therefore, the bushing and washer bearing structures are more susceptible to breakage when exposed to forces, such as the forces experienced during a stall condition.

A number of structures in the gas turbine engine, including the bushing and washer structures, used with variable stator vanes are subjected to conditions of wear at temperatures ranging from low temperatures to highly elevated temperatures. In addition, the bushing and washers are subject to high altitude atmospheres. In addition to low temperatures, high altitude atmosphere includes little or no water vapor. Water vapor is required for conventional graphite containing lubricants to maintain lubricity.

One known material for fabrication of bushings for variable stator vane assemblies is a specially developed composite of carbon fiber reinforcing materials in a polyimide resin matrix manufactured by E. I. Du Pont De Nemours and Company of Wilmington, Del. The bushings are commonly known as VESPEL®CP™ bushings. VESPEL® and CP™ are trademarks that are owned by E. I. Du Pont De Nemours and Company. The polyimide resin used in the VESPEL®CP™ bushings is commonly known as NR150™. The NR150™ trademark is owned by Cytec Technology Group of Wilmington, Del. Although the VESPEL®CP™ bushings have an extended life at temperatures 450–500° F. (232–260° C.), the VESPEL®CP™ bushing have an upper temperature limit of 600° F. (316° C.). Extended operation at temperatures at or above 600° F. (316° C.) limit their operational life. The polymer matrix bushings do not withstand the combinations of high temperature and vibrational loading experienced in the operation of the gas turbine engine well, leading to a relatively short part life.

Another known method for reducing wear on the variable stator vane assembly is placing a carbon-containing antifriction coating on a surface in the variable stator vane assembly. This antifriction coating is a coating fabricated from a material that reduces the coefficient of friction between the surface of the trunnion and the surface of the casing. One carbon-containing component known for lubricant coating is graphite. However, graphite has the disadvantage that water vapor is required to maintain lubricity. Atmospheres at aircraft cruise altitudes do not have enough water vapor present for graphite to be lubricious. Graphite also has the disadvantage of poor tribological properties in applications that require reciprocating motion. An additional disadvantage of graphite is that graphite begins to oxidize rapidly at temperatures at or greater than 500° C. (932° F.). Some variable stator vane systems may experience temperatures in excess of 500° C. (932° F.). Therefore, a replacement material for graphite in antifriction coating is needed.

Attempts have also been made to coat the stator vane trunnion with a wear coating. The wear coating attempts to incorporate the low coefficient of friction materials known in the art with hard, smooth wear resistant coating materials into a coating on the vane trunnion. However, the wear coating alone lacks the ability to maintain the properties of each of the individual components (i.e., fails to maintain both low coefficient of friction and wear resistance). In other words, the single wear coating does not provide all of the desired tribological properties (e.g., reduced wear and low coefficient of friction) required for extended operation of variable stator vanes subject to conditions of high temperature, vibration and high altitude atmospheres.

Accordingly, it would be desirable to provide bearing assemblies fabricated from materials having performance characteristics that will reduce or eliminate air leakage between the stator vane stem and the compressor casing while providing an increase in the durability of the bushing and washer to increase part life in high temperature and vibration loading applications. The present invention fulfills this need, and further provides related advantages.

SUMMARY OF THE INVENTION

Materials, heretofore unknown for use in bearing assemblies, which produce equal or better wear resistance at reduced materials cost have been identified. These alternatives fall into three general categories: (1) solid materials from which bushings and washers can be fabricated, (2) coatings bonded to metallic vanes to minimize total system wear, and (3) solid lubricant coatings placed on any bushing, washer and/or vane trunnion to reduce friction. A large number of combinations therefore exist that can provide solutions to specific mechanical designs. Each design is subjected to different temperature limitations, stresses and cyclic vibrations. Thus a solution for one system may not be an effective solution for a different mechanical system. In addition, the solution must be cost effective for the mechanical system into which it is installed. The present invention provides an effective and cost effective replacement for carbon fiber/polymer matrix bushing systems currently used in existing engine systems and engine systems being developed. The bushing systems of the present invention replace existing bushing systems that are used between vanes made from A286 material, a stainless steel or titanium alloy 6-4 and casings made from M152 material, a steel.

The present invention utilizes a ceramic bushing comprising either silicon nitride ($Si_3N_4$), tungsten carbide (WC), or zirconium oxide ($ZrO_2$). In another embodiment, the bushing may comprise metallic alloys, such as STELLITE® 6, M152, 17-4 PH, or 410 stainless steel. These bushings are strong but relatively inflexible. The vane trunnion may be coated with a tungsten carbide coating or a modified tungsten carbide. Modified tungsten carbide is a tungsten carbide with a small amount of cobalt (WC—Co) sufficient to impart wear resistance, typically about 6–20% by weight Co and preferably about 12% by weight Co. Alternatively, the trunnion may be coated with a plasma vapor deposited (PVD) titanium nitride or tungsten carbide. An antifriction coating may be applied between the tungsten carbide coated vane and the bushing.

One advantage of an embodiment of the present invention is that the bearing assembly materials significantly improve the service life of the stator vane assembly and reduce air leakage through the opening in the stator casing.

Yet another advantage of an embodiment of the present invention is that the materials used in the improved seal tube of the bushing assembly have a reduced elastic modulus as compared to the identical non-porous material and compared to the surrounding metallic material. The reduced elastic modulus provides additional flexibility and increases the ability of the bushing to withstand flexing of the surrounding casing and vane structure without breakage.

Yet another advantage of an embodiment of the present invention is that the materials used in the improved bushing assembly includes porous material having a reduced density resulting in a desirable reduction in weight within the gas turbine engine.

Yet another advantage of the lubricant coating, according to an embodiment of the present invention, is that the wear coating and antifriction coating combination reduces wear and maintains desirable tribological properties in high altitude atmospheres having little or no water vapor.

Yet another advantage of the lubricant coating, according to an embodiment of the present invention, is that the variable stator vane assembly provides an efficiency improvement in the turbine engine while reducing overhaul costs caused by wear resulting from metal on metal contact between the stator casing surface and the stator vane surface.

Yet another advantage of the lubricant coating, according to an embodiment of the present invention, is that the materials used in the variable stator vane assembly of the present invention, including the antifriction coating, can readily withstand the higher temperatures of operation utilized in current advanced engine designs. The materials used in the antifriction coating of the present invention can be utilized at temperatures greater than about 1000° F. (538° C.), including operational temperatures of up to about 1200° F. (649° C.), without significant deterioration due to the combined effects of temperature, vibration, and high altitude atmosphere.

Yet another advantage of the lubricant coating of an embodiment of the present invention is that the antifriction coating is capable of maintaining lubricity in applications that rub in a reciprocating motion.

Another advantage of the lubricant coating, according to an embodiment of the present invention, is that the antifriction coating is resilient and regenerates in areas where the antifriction coating is rubbed thin or cleaned off the wear surface.

Yet another advantage of an embodiment of the present invention is that the method provides an inexpensive fabrication method that provides a seal tube at near-net shape, requiring few or no subsequent processing steps prior to installation into the bearing system.

Other features and advantages of the present invention will be apparent from the following more detailed description of the preferred embodiment, taken in conjunction with the accompanying figures which illustrate, by way of example, the principles of the invention.

DETAILED DESCRIPTION OF THE INVENTION

Figure 1:
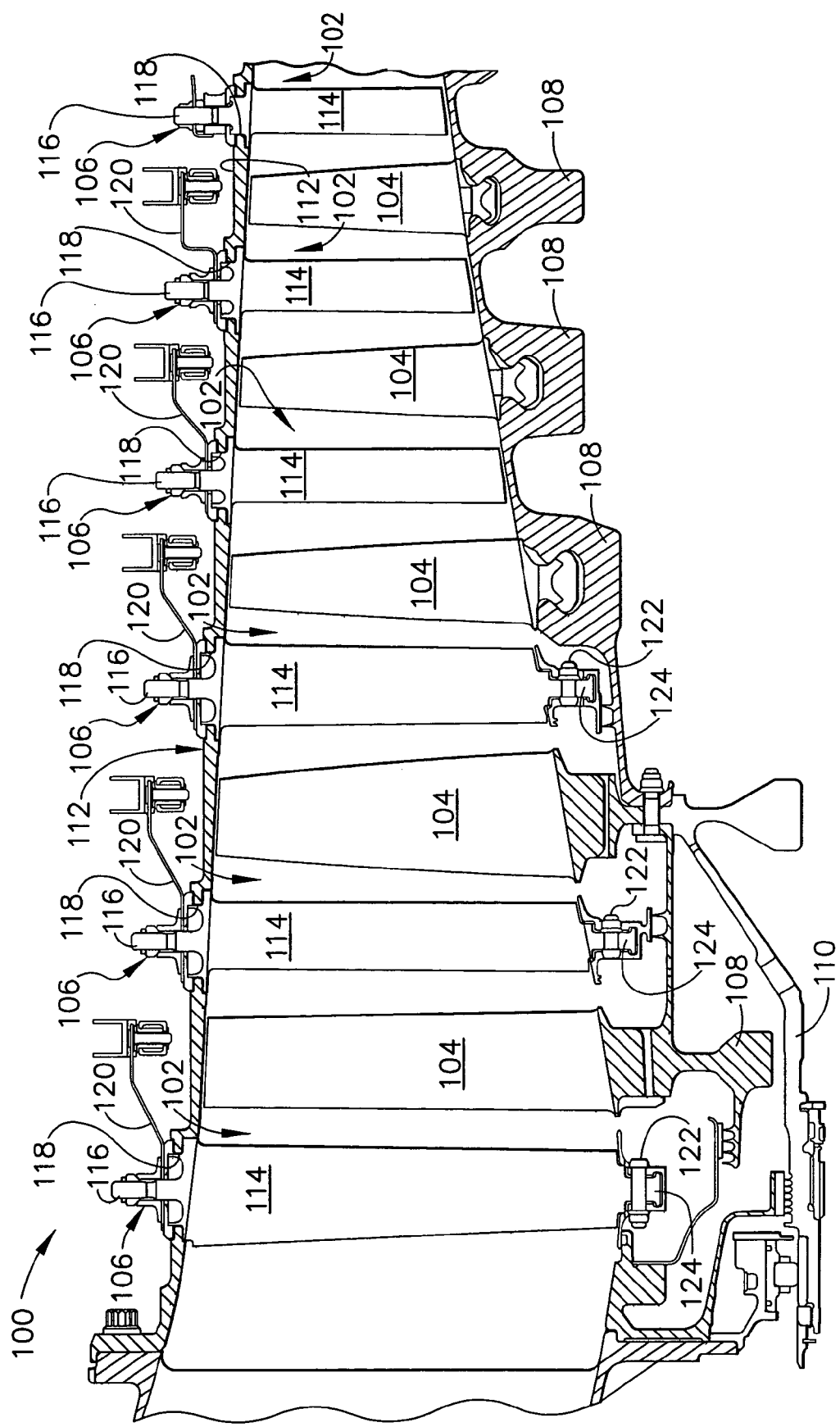
FIG. 1 is a schematic view of a portion of a prior art high pressure compressor for a turbine engine.

FIG. 1 is a schematic view of a section of a known high-pressure compressor 100 for a turbine engine (not shown). Compressor 100 includes a plurality of stages 102, and each stage 102 includes a row of rotor blades 104 and a row of variable stator vane assemblies 106. Rotor blades 104 are typically supported by rotor disks 108, and are connected to a rotor shaft 110. Rotor shaft 110 is a high-pressure shaft that is also connected to a high-pressure turbine (not shown). Rotor shaft 110 is surrounded by a stator casing 112 that supports variable stator vane assemblies 106.

Each variable stator vane assembly 106 includes a variable vane 114 and a vane stem 116. Vane stem 116 protrudes through an opening 118 in casing 112. Variable vane assemblies 106 further include a lever arm 120 extending from variable vane 114 that is utilized to rotate variable vanes 114. The orientation of variable vanes 114 relative to the flow path through compressor 100 control airflow therethrough. Some variable vane assemblies 106 are secured to shroud 124 by bolts 122.

Variable vane assemblies 106 control airflow through compressor 100. However, variable vane assemblies 106 also provide a potential pathway for airflow to exit compressor 100, such as through openings 118. Airflow through openings 118 reduces the efficiency of compressor 100.

Figure 2:
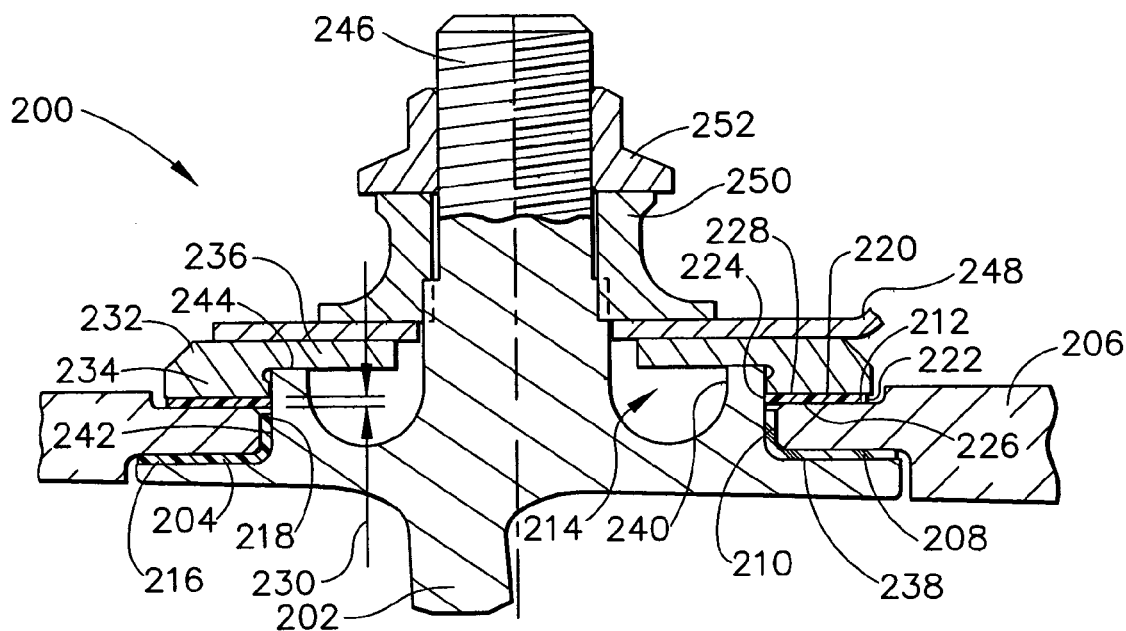
FIG. 2 is a cross-sectional view of a prior art variable vane assembly used in an aircraft turbine engine high pressure compressor.

FIG. 2 is a cross-sectional view of a known variable vane assembly 200. Variable vane assembly 200 includes a variable vane 202. A bushing 204 is positioned on variable vane 202. A casing 206 supports variable vane 202 and includes a first recessed portion 208, an inner portion 210, and a second recessed portion 212. An opening 214 is formed by inner portion 210.

Bushing 204 includes a first portion 216 and a second portion 218. Bushing first portion 216 is in direct contact with casing first recessed portion 208 and separates variable vane 202 from casing 206. Bushing second portion 218 contacts casing inner portion 210 and separates variable vane 202 from casing 206. Bushing first portion 216 extends substantially an entire length of casing first recessed portion 208. In addition, bushing second portion 218 extends substantially an entire length of casing inner portion 210 and is substantially perpendicular to bushing first portion 216. Bushing 204 prevents variable vane 202 from directly contacting casing 206.

Variable vane assembly 200 further includes a washer 220. Washer 220 is substantially flat and includes an outer diameter surface 222 and an inner diameter surface 224. More specifically, washer 220 includes a first wall 226, a second wall 228, and a thickness 230 that is substantially constant from outer diameter surface 222 to inner diameter surface 224. Washer 220 is in direct contact with casing second recessed portion 212 and extends substantially an entire length of casing second recessed portion 212.

Variable vane assembly 200 includes a spacer 232 in contact with washer 220. Washer 220 prevents contact between spacer 232 and casing second recessed portion 212. Spacer 232 includes a spacer first portion 234 and a spacer second portion 236. Spacer first portion 234 contacts washer 220 and has a length substantially equal to a radial length of washer 220. Spacer 232 is separated from bushing 204 by washer 220. Bushing 204 and washer 220 do not contact each other. Washer 220 prevents spacer 232 from contacting casing 206.

Variable vane 202 also includes a vane first portion 238, a ledge 240 having a ledge outer portion 242, and a spacer-seating portion 244. Ledge 240 surrounds a vane stem 246. Vane stem 246 (corresponding to FIG. 1, 116) and ledge 240 extend through opening 214 (corresponding to FIG. 1, 118) in casing 206 (corresponding to FIG. 1, 112). Bushing second portion 218 extends along casing inner portion 210 of casing 206. Bushing second portion 218 prevents ledge outer portion 242 from contacting casing inner portion 210.

Variable vane assembly 200 also includes a lever arm 248 positioned around vane stem 246 and contacting spacer 232. Lever arm 248 is utilized to adjust the angle of variable vane 202, and thus alter the flow of air through the compressor.

In addition, variable vane assembly 200 includes a sleeve 250 contacting lever arm 248, and a lever arm nut 252 contacting sleeve 250. Lever arm nut 252 cooperates with vane stem 246 and maintains variable vane assembly 200 in contact with casing 206.

Variable vane assembly 200 is assembled by placing bushing 204 on variable vane 202 such that bushing first portion 216 and bushing second portion 218 contact variable vane 202 and are substantially perpendicular. Variable vane 202 and bushing 204 extend through opening 214 of casing 206.

Washer 220 is placed on casing 206 adjacent bushing 204. Spacer 232 is positioned on variable vane 202 and contacts washer 220. Lever arm 248 is positioned over vane stem 246 and contacts spacer 232. Sleeve 250 is positioned over vane stem 246 and contacts lever arm 248. Finally, lever arm nut 252 is positioned over vane stem 246 and contacts sleeve 250.

Washer 220 and bushing 204 form a bearing assembly used in variable vane assembly 200 and may be used, for example, in a high-pressure compressor. Washer 220 and bushing 204 may be utilized in other environments such as a rotor vane assembly, a low-pressure compressor variable vane assembly, a high-pressure turbine, an intermediate-pressure turbine or a low-pressure turbine.

Materials, heretofore unknown for use in bearing assemblies, which produce equal or better wear resistance at reduced materials cost have been identified. These alternatives fall into four general categories: (1) solid materials from which bushings and washers can be fabricated, (2) coatings bonded to metallic vanes to minimize total system wear, (3) solid lubricant coatings placed on any bushing and/or the vane stem or bushing fitted over the vane stem to reduce friction, and (4) porous seal tube materials that are wear resistant, capable of high temperature service and have a reduced elastic modulus.

Ideally, the solid bushing should be durable with good wear characteristics, however, the bushing should wear before the case and vane stem (either coated or uncoated) because the bushing is the least expensive and most easily replaced component. The bushings and washers are fabricated by a process according to an embodiment of the present invention that includes an injection molding process or forming a predetermined shape under pressure, then sintering at high temperature to burn away organic binder and fuse the ceramic particles.

Suitable solid materials for the bushing include injection molded silicon-nitride such as $Si_3N_4$, tungsten carbide, and injection molded zirconia. Other suitable materials include, but are not limited to, metallic alloys, such as STELLITE® 6, M152, 17-4 PH, or 410 stainless steel. STELLITE® is a federally registered trademark owned by Deloro Stellite Holdings Corporation of St. Louis, Mo. The composition of STELLITE® 6 is well-known in the art and is a designation for a cobalt-based alloy comprising about 28 weight percent chromium, about 4.5 weight percent tungsten, about 1.2 weight percent carbon, about 1.1 weight percent silicon, about 1.0 weight percent manganese, a maximum of about 3 weight percent nickel, a maximum of about 3 weight percent iron and the balance cobalt. The composition of M152 is well-known in the art and is a designation for a stainless steel comprising about 12 weight percent chromium, about 2.5 weight percent nickel, about 1.8 weight percent molybdenum, about 0.1 weight percent carbon, about 0.3 weight percent vanadium and balance iron. The composition of 17-4 PH is well-known in the art and is a designation for a stainless steel comprising about 16.5 weight percent chromium, about 4 weight percent nickel, about 3.5 weight percent copper, about 0.3 weight percent niobium, about 0.03 weight percent carbon and balance iron. The composition of 410 stainless steel is well-known in the art and is a designation for a stainless steel comprising about 12 weight percent chromium, about 1.0 weight percent manganese, 1.0 weight percent silicon, about 0.15 weight percent carbon, about 0.04 weight percent phosphorous, about 0.03 weight percent sulfur and balance iron. The present invention may utilize either a $Si_3N_4$, tungsten carbide, $ZrO_2$, STELLITE® 6, M152, 17-4 PH, or 410 stainless steel for the bushing. These bushing materials provide improved wear and higher temperature capability than existing Vespel bushings.

The bushing assembly can assume several configurations. The least expensive alternative utilizes plain bushings with washers as described above instead of flanged bushings. This minimizes possible tensile forces that could cause failure of the ceramic. Two alternative configurations of the spacer bushing that separate the bearing bushing are envisioned. Both of these spacer bushing designs increase the flexibility of the spacer so it may act with the flexibility of a seal.

Figure 3:
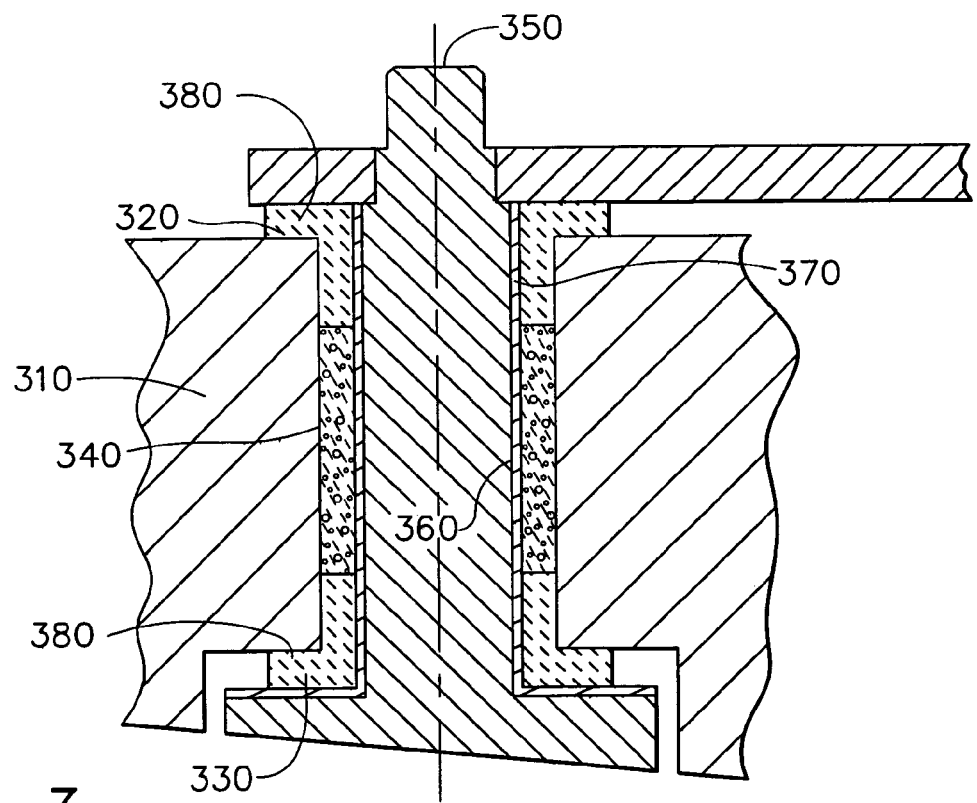
FIG. 3 is a cross sectional view of a bushing assembly of the present invention used in a variable vane assembly of the present invention.

Referring to FIG. 3, which depicts a bushing configuration of the present invention, a bushing assembly is comprised of a first end 320, a second end 330 and a seal tube portion 340 intermediate to the first end 320 and the second end 330. The first end 320 and second end 330 shown in FIG. 3 includes flanged sections 380, which are comprised of ceramic or metallic material. The stainless steel vane 350 extends through the bushing assembly disposed within casing 310. The ceramic materials for use in the bushing assembly may include silicon nitride, tungsten carbide, or zirconia. Alternatively, the material for the bushing assembly may include metallic alloys, such as STELLITE® 6, M152, 17-4 PH, or 410 stainless steel. The ceramic materials used for these bushings are both strong and stiff in their non-porous form. However, the performance of the seal tubes comprising these materials can be improved by reducing the elastic modulus of the seal tube portion 340 of the bushing. This may be accomplished by including from about 10% to about 35% by volume closed pore porosity, and preferably up to 20% closed pore porosity, in this portion of the bushing. By including closed pore porosity in the seal tube portion 340 of the bushing, the elastic modulus is reduced rendering the seal tube portion 340 more elastic and less stiff, even though the seal tube portion 340 is comprised of the same material as the dense bearing bushing at first end 320 and second end 330. The porous ceramic material of the seal tube portion 340 of the bushing has an elastic modulus that is less than the elastic modulus of either first end 320 and second end 330. The elastic modulus is preferably from about 20% to about 50% less than the elastic modulus of a part comprising a non-porous ceramic material of the same composition. More preferably the elastic modulus is about 50% less than the elastic modulus of a part comprising a non-porous ceramic material of the same composition when there is 20% closed pore porosity. In particular, the porous ceramic material has an elastic modulus that is from about 20% to about 50% less than a non-porous ceramic material having substantially identical composition. The advantage of having a lower elastic modulus in the seal tube portion 340 of the bushing assembly is that interface forces that normally are present in a bushing with a uniform elastic modulus are transmitted to either first end 320 or second end 330. This reduces interface forces and wear in the critical seal area and further extends the life of the bushing assembly.

Figure 4:
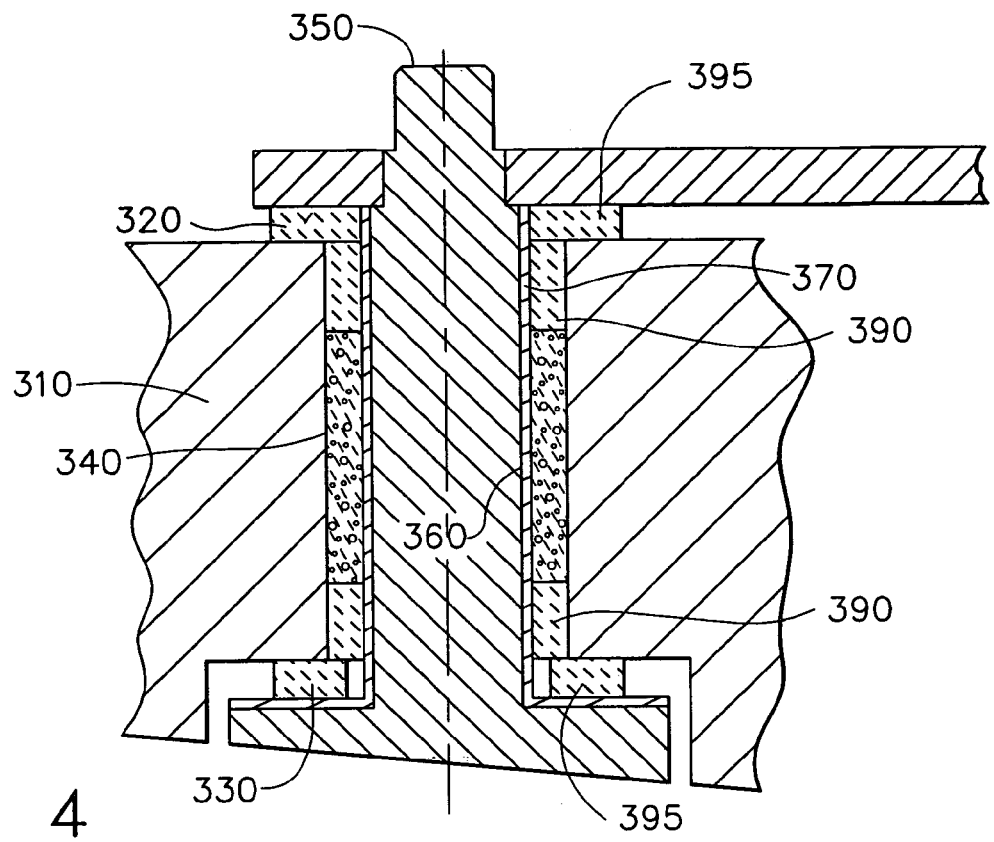
FIG. 4 is a cross sectional view of a bushing assembly according to an alternate embodiment of the present invention used in a variable vane assembly of the present invention.

Referring now to FIG. 4, there is depicted another embodiment of the bushing assembly. FIG. 4 includes the structure shown in FIG. 3. However, instead of the flanged section 380, FIG. 4 shows the first end 320 and the second end 330 having a straight section 390 with an intermediate seal tube portion 340. In addition, FIG. 4 further shows washers 395 as a part of the first end 320 and the second end 330. Washer 395 at the first end 320 is disposed between the casing 310 and the lever assembly extending from the vane 350. Washer 395 at the second end 330 is disposed between the casing 310 and the vane 350.

Figure 5:
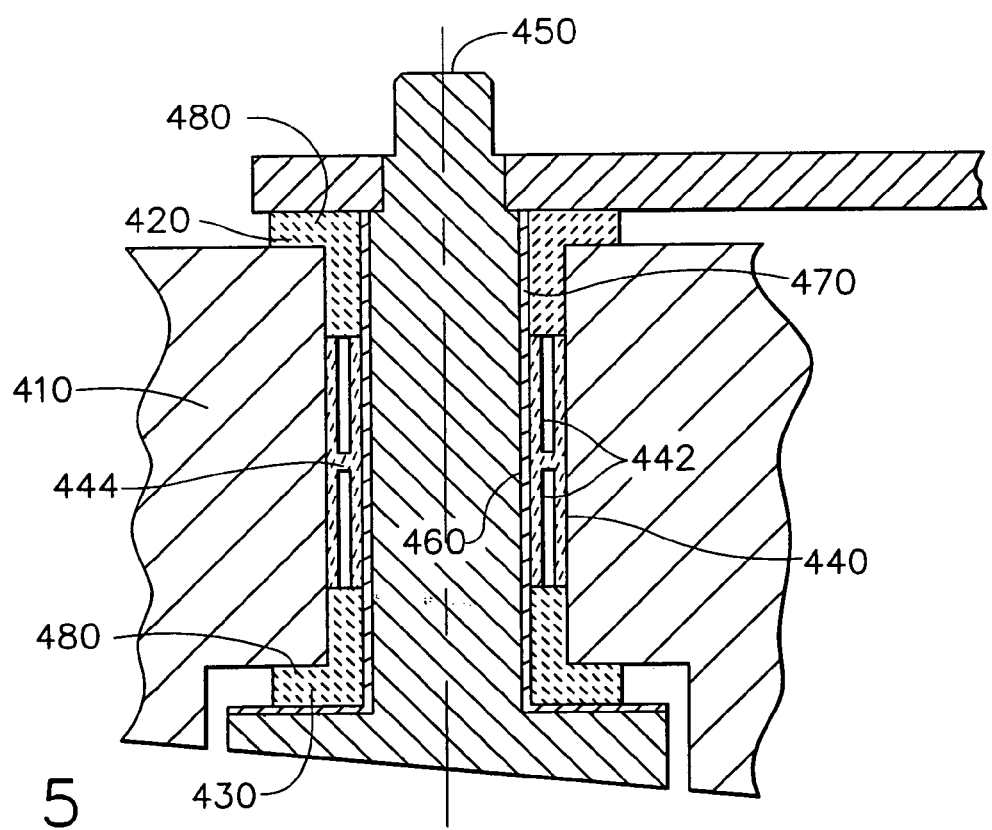
FIG. 5 is a cross sectional view of a bushing assembly of the present invention used in a variable vane assembly of the present invention depicting a seal tube portion having an H-profile.

Referring now to FIG. 5, there is depicted another embodiment of a bushing assembly. Like the bushing assembly depicted in FIGS. 3 and 4, the bushing assembly may be a silicon nitride, tungsten carbide, or a zirconium oxide material. Alternatively, the bushing assembly may be fabricated from a metallic material, such as STELLITE® 6, M152, 17-4 PH, or 410 stainless steel. A stainless steel vane stem 450 extends through the bushing assembly disposed within casing 410. The bushing assembly includes a first end 420 and a second end 430. First end 420 and second end 430 may be flanged section 480 as shown. The bushing assembly also includes a seal tube portion 440 that has an improved elastic flexibility. However, the improved flexibility is achieved by an H-profile, which includes two circumferential voids 442 separated by a connecting segment 444. This arrangement in cross-section such as given in FIG. 5, appears as an H and hence is referred to as a H-profile. The seal tube portion 440 is made from the same material as the first end 420 and second end 430. The seal tube portion 440 is modified to provide improved flexibility. As should be clear, the H-profile in the seal tube portion 440 results in this section of the bushing being more flexible. As a result, interface forces in this area as a result of contact between the bushing assembly and vane 450 are transmitted to first end 420 and second end 430, both of which are dense and stiff. This extends bushing life in the seal tube portion 440 while minimizing frictional forces in the seal tube portion 440. Of course, the flexibility of an H-profile seal tube portion 440 made with 20% closed-pore porosity would be even more flexible.

Figure 6:
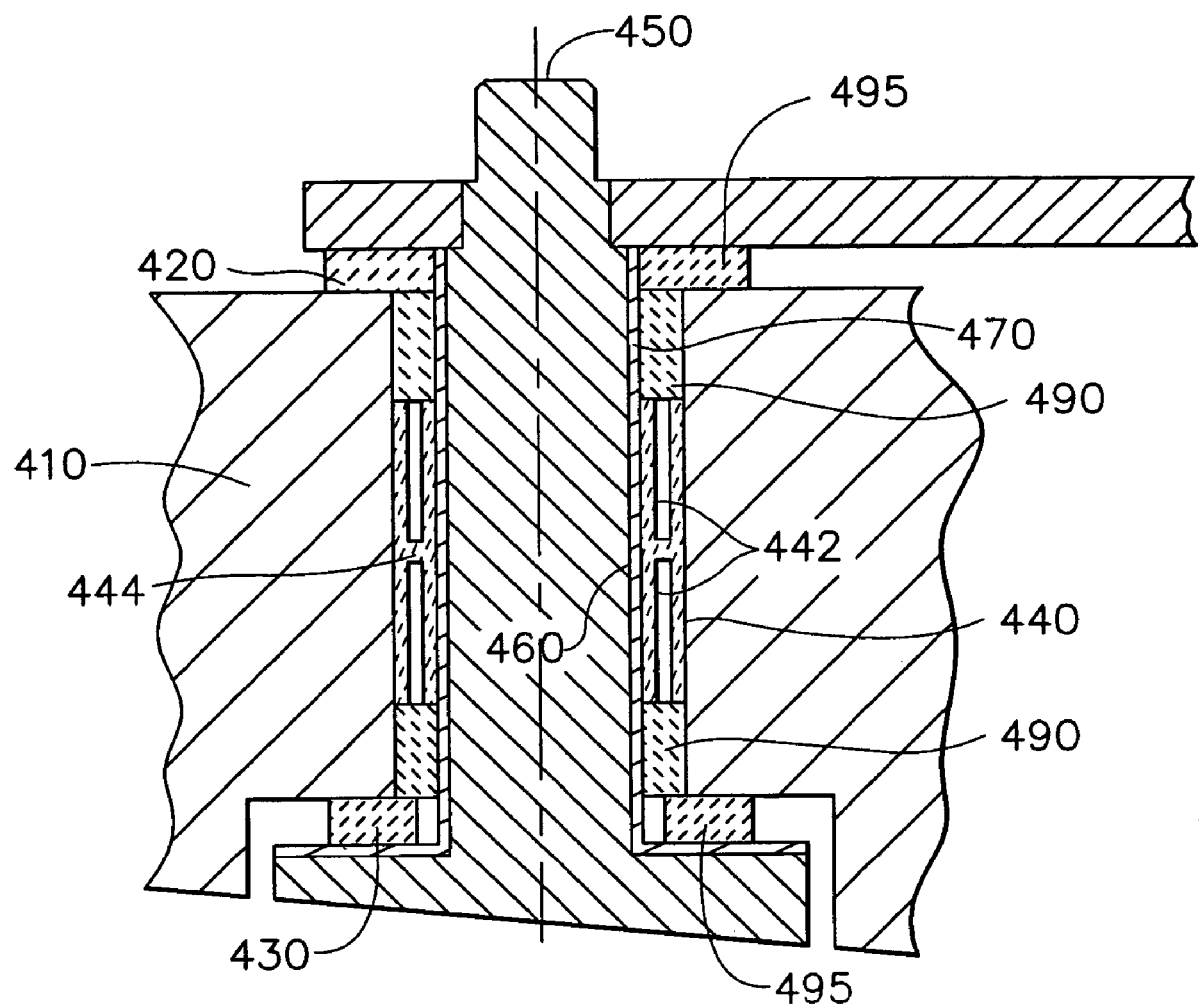
FIG. 6 is a cross sectional view of a bushing assembly according to an alternate embodiment of the present invention used in a variable vane assembly of the present invention depicting a seal tube portion having an H-profile.

Referring now to FIG. 6, there is depicted another embodiment of the bushing assembly. FIG. 6 includes the structure shown in FIG. 5. However, instead of flanged section 480, FIG. 6 shows the first end 420 and the second end 430 having a straight section 490 with an intermediate seal tube portion 440. In addition, FIG. 6 shows washers 495 as a part of the first end 420 and the second end 430. Washer 495 at the first end 420 is disposed between the casing 410 and the lever assembly extending from vane 450. Washer 495 at the second end 430 is disposed between the casing and the vane 450.

Figure 7:
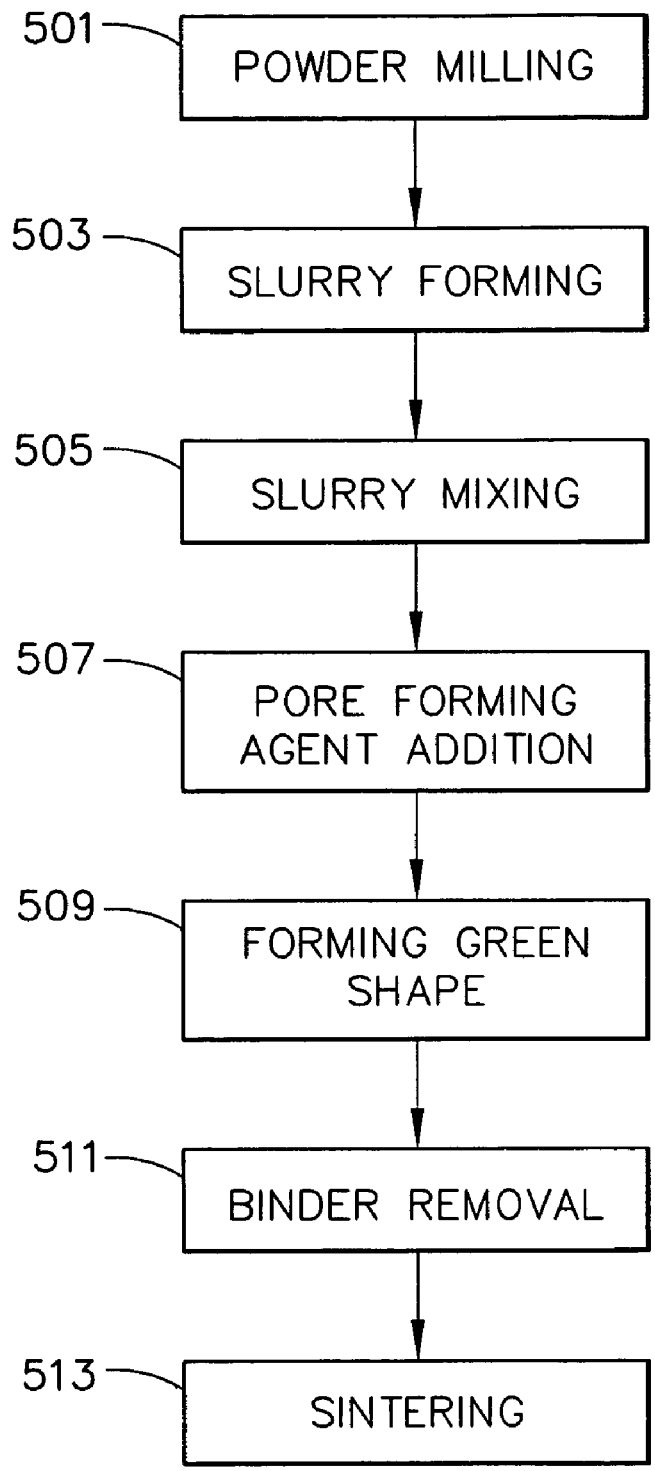
FIG. 7 illustrates a method according to an embodiment of the present invention.

FIG. 7 illustrates a method according to an embodiment of the present invention. As shown in FIG. 7, in step 501, a powdered ceramic material, such as $Si_3N_4$, tungsten carbide or $ZrO_2$, is powder milled for a time up to about 48 hours. Additives, such as sintering agents or forming agents may be added to the powdered ceramic material. The powder milling optionally takes place in order to reduce agglomerations and decrease particle size, in order to improve the mixing between powders. In step 503, the ceramic powder mixture is then formed into a slurry by addition of solvents and/or polymer binder material in order to form a slurry comprising from about 40% to about 60% solid by weight. The formed slurry from step 503 is then mixed for about 24 hours to about 2 weeks in step 505.

Upon completion of the slurry mixing step 505, a pore forming agent is added to the slurry in step 507. The pore forming agent of step 507 may be any material capable of forming pores in a sintered ceramic material. In particular, the pore forming agent is a material capable of forming pores within the formed green (i.e., unsintered) part that result in pores within the sintered ceramic material once the sintering step takes place. Suitable pore forming agents include, but are not limited to hollow or solid polymer spheres, glass spheres, ceramic spheres, particles of organic material or blowing agents. Blowing agents are any materials that decompose to release gas and form pores within the ceramic material. The pore forming agents are mixed into the slurry for from about 2 minutes to about 48 hours.

After the pore forming mixing step 507, the green shape is formed in step 509. A green shape is formed from a slurry that has not been sintered and may be formed and/or shaped into a desired geometry. The forming and/or shaping may take place using any known forming and/or shaping process, including, but not limited to, injection molding, casting or otherwise forming under pressure. The forming step 509 may also include additional steps such as addition of initiators, addition of sintering agents or other additives, and degassing the slurry.

After forming step 509 takes place, the formed green shape is then sintered. Sintering takes place by first removing the binder. The binder removal step takes place by heating to 600° C. and soaking for from about 0.1 hours to about 3 hours. Heating to the binder removal temperature may take place at any suitable rate. Suitable heating rates to the binder removal temperature include from about 30° C. to about 50° C./hour. The binder removal step may result in some additional porosity resulting from the decomposition of the binder and/or solvent within the green shape. After the binder has been sufficiently removed, the part is heated to a temperature of about 1650° C. to about 1850° C. for times of about 0.5 hours to about 1.5 hour. Suitable heating rates to the sintering temperature include from about 20° C. to about 50° C./hour. The sintered ceramic material results in a porous, sintered product having a near-net shape. A product having a near-net shape is a finished product having a reduced or eliminated amount of machining prior to installation, such as installation into a gas turbine engine. In an embodiment of the present invention wherein the bushing comprises a cylindrical seal tube of the porous ceramic material, the excess material present and requiring machining (e.g., excess material present on the inside diameter and/or outside diameter of the seal tube) is preferably less than about 0.025 inches. More preferably, the excess material present and requiring machining is less than about 0.020 inches. Still more preferably, the excess material present and requiring machining is less than about 0.010 inches.

In the present invention, to further reduce the wear and friction forces between the vane, 350 and 450 in FIGS. 3–4 and 5–6, respectively and the ceramic bushing assemblies, the vane 350, 450 is coated with a WC, titanium nitride or WC—Co coating 360, 460 in FIGS. 3–4 and 5–6 respectively. Wear coatings 360, 460 are provided on metal surfaces to provide a surface having desirable wear properties, such as high hardness and wear resistance. Materials used in the variable stator vane system include materials that are suitable for receiving the wear coatings 360, 460. Suitable material for receiving wear coatings 360, 460 may include, but are not limited to, nickel-based superalloys, titanium and its alloys, cobalt-based superalloys, iron-based superalloys and stainless steel. Wear coatings 360, 460 provide a surface that has the properties of being both hard and smooth and capable of receiving an antifriction coating 370, 470. In one embodiment of the present invention, the vane 350, 450 is coated with a cemented tungsten carbide. Cemented tungsten carbides include those tungsten carbides that include a sufficient amount of cobalt to impart wear resistance. Sufficient amounts of cobalt are typically about 6–20% by weight and preferably about 12% by weight. The wear coating 360, 460 may be applied by a plasma spray technique or other suitable method known in the art. A suitable plasma spray technique is high velocity oxy-fuel (HVOF) spraying, although other plasma spray techniques such as low-pressure plasma spray (LPPS) and air plasma spraying (APS) may be used to successfully apply the coating. Alternatively, the trunnion 350, 450 may be coated with a physical vapor deposition (PVD) deposited wear coating 360, 460 of titanium nitride or tungsten carbide. The preferred coating is a relatively thin wear coating 360, 460 of titanium nitride or tungsten carbide applied by PVD. These wear coatings 360, 460 may be applied to a thickness as low as about 0.0002 inches and as high as about 0.010. Preferably, the coating thicknesses are in the range from about 0.0005 to about 0.005 inches, most preferably coating thickness of about 0.001 inches. The resultant wear coating 360, 460 provides a hard, smooth surface resistant to wear.

The present invention also utilizes a solid, but soft, antifriction coating 370, 470 placed between the bushing and the WC or WC—Co coated vane trunnion 350, 450. This antifriction coating 370 and 470 are depicted at location 370 and 470 in FIGS. 3–4 and 5–6 respectively. The present invention also utilizes an antifriction coating 370, 470 placed between the bushing assembly and the vane 450. The antifriction coating 370 is preferably coated on a surface of the wear coating 360, 460, but may also be applied to the inside surface of the bushings 390, 490 and seal tube portion 340, 440, as well as the surface of washers 320, 420 and 330, 430.

The antifriction coating 370, 470 comprises a binder, a friction modifying agent, and, optionally, an additive. The binder of the antifriction coating 370, 470 comprises a material selected from the group consisting of sodium silicate, aluminum phosphate, titanium oxide and combinations thereof. The friction-modifying agent is preferably dispersed substantially uniformly through the binder. The antifriction coating 370, 470 reduces the coefficient of friction between the bushing system and wear coating 360, 460. Of the antifriction coating binders, aluminum phosphate and titanium oxide are preferred. As the variable stator vane bushing assembly operates, the antifriction coating 370, 470 may eventually be consumed. The antifriction coating 370, 470 is resilient and regenerates in areas where the coating is rubbed thin or cleaned off the wear surface. The antifriction coating 370, 470 is thin when the thickness on a portion of the surface is insufficient to provide sufficient lubricity to the sliding surfaces to maintain the coefficient of friction at the desired level. During operation, the antifriction coating 370, 470 may migrate from location to location along the wear surface. The migration of the antifriction coating 370, 470 allows areas that have less material or are rubbed completely off to receive antifriction coating material from other locations along the wear surface to regenerate the coating missing from the area rubbed thin or completely off.

The binder material for use in the antifriction coating 370, 470 is any binder material that is tribologically compatible with all of the following materials: 1) water, 2) detergents used in the cleaning of gas turbine engine parts, 3) deicers known in the art used to deice aircraft in winter, 4) aircraft fuel, 5) oil and 6) hydraulic fluid. The materials are tribologically compatible if the binder in the antifriction coating 370 maintains tribological properties (e.g., lubricity and wear resistance) of the antifriction coating 370, 470 when in contact with the surfaces subjected to sliding friction and in contact with the materials listed above. In order to maintain tribological properties, the binder exhibits the ability to remain coated on the substrate, does not result in separation of the friction modifier and the binder, and does not result in substantial softening of the antifriction coating. Suitable binder materials include, but are not limited to, sodium silicate, aluminum phosphate, titanium oxide and combinations thereof. Binders that provide the highest tribological compatibility include titanium oxide and aluminum phosphate.

The friction modifier is any material that, when added to the binder, produces a friction coefficient suitable for rotating a stator vane in a variable stator vane assembly, capable of maintaining desirable tribological properties at high altitude atmospheres and and/or high temperatures. The high altitude atmospheres include atmospheres to which aircraft are exposed during flight. The high altitude atmosphere includes atmospheres having reduced water vapor. High temperature exposure is a result of the operation of the gas turbine engine. The compression of the gas and the combustion of the fuel result in high temperatures in gas turbine engines. Parts within the gas turbine engine are subject to high temperatures. The coating system of the present invention may find uses in parts within the gas turbine engine that are exposed to temperatures up to about 1200° F. Desirable tribological properties include, but are not limited to low coefficient of friction between sliding surfaces (i.e., high lubricity) and low wear between sliding surfaces. Suitable friction modifier materials include, but are not limited to, tungsten sulfide (e.g., $WS_2$), bismuth telluride (e.g., $Bi_2Te_3$), copper sulfide (e.g., $Cu_2S$), bismuth oxide (e.g., $Bi_2O_3$) and combinations thereof. Of the friction modifiers, tungsten sulfide (e.g., $WS_2$), bismuth telluride (e.g., $Bi_2Te_3$) and bismuth oxide (e.g., $Bi_2O_3$) are preferred.

Table 1 shows examples of antifriction coating materials according to the present invention. These examples do not limit the invention to the combinations of binders and friction modifiers shown therein. Examples 1–5, shown in Table 1, include coefficient of friction (COF) results for particular friction modifier and binder combinations. In order to determine the coefficient of friction, the antifriction coating materials are subject to a sliding wear test as known in the art. The tests were conducted with a reciprocating stroke length of 0.060 inches. Antifriction coating material (i.e., inert material, binder and friction modifier) were loaded onto the wear surfaces and dried to form an antifriction coating 370, 470. The coated wear surfaces were then subject to a load of 50 lbs. and reciprocation motion. The coefficients of friction were measured at various temperatures during the test and an average coefficient (i.e., Avg COF) of friction was calculated as the coefficient of friction for the wear system. Table 1 shows the an average coefficient of friction for each example having the average coefficient of friction resulting from tests run at various friction modifier to binder loadings. The antifriction coating 370, 470 was formed from drying a composition on the test surface having a binder loading of 10% by weight and friction modifier loadings of from 15% by weight to 25%, corresponding to friction modifier to binder weight ratios of from 1.5:1 to about 2.5:1. The balance of the composition is of essentially inert material that is removed during drying.

TABLE 1

| Ex. | Binder 10% | Friction Modifier | COF Initial | COF room temp. | COF at 400° F. | COF at 750° F. | Avg COF |
|---|---|---|---|---|---|---|---|
| 1 | titanium oxide | tungsten sulfide | 0.2 | 0.5 | 0.4 | 0.6 | 0.43 |
| 2 | titanium oxide | bismuth telluride | 0.3 | 0.7 | 0.7 | 0.6 | 0.58 |
| 3 | titanium oxide | bismuth oxide | 0.2 | 0.7 | 0.7 | 0.6 | 0.55 |
| 4 | titanium oxide | copper sulfide | 0.3 | 0.6 | 0.7 | 0.6 | 0.55 |
| 5 | aluminum phosphate | tungsten sulfide | 0.3 | 0.4 | 0.5 | 0.5 | 0.43 |

The friction modifier is preferably incorporated into antifriction coating in a quantity of about 10% to about 500% by weight of binder. More preferably, the friction modifier is incorporated into the antifriction coating from 100% to about 350% by weight of binder. The friction modifier is incorporated into the binder material and is preferably encapsulated in the binder material. Encapsulation may take place using any suitable encapsulation method, including but not limited to powder metallurgical encapsulation methods. The antifriction coating 370, 470 including the binder and friction modifier is coated onto the surfaces subject to wear (i.e., wear surface). Suitable methods for coating include, but are not limited to, spraying or dipping the surface to be coated with an antifriction coating 370, 470 and subsequently drying the antifriction coating 370, 470, removing at least some of the inert material present. The dried surface forms an antifriction coating 370, 470 that is tenacious and substantially uniform across the wear surface. Optionally, the antifriction coating 370, 470 may be heated during the drying step. Table 2 shows the average coefficient of friction and wear in inches for various friction modifier loadings in the coating composition. In addition, Table 2 shows the average number of sliding cycles (i.e. reciprocations) used in Examples 6–11 at room temperature, 400° F. (204° C.), and 750° F. (399° C.), which resulted in the average wear shown.

TABLE 2

| Ex. | Binder (10% Loading) | Friction Modifier | Friction Modifier Loading (%) | Friction Modifier to Binder Weight Ratio | Avg COF | Average Wear (inches) | Average Sliding Cycles |
|---|---|---|---|---|---|---|---|
| 6 | titanium oxide | tungsten sulfide | 25 | 2.5:1 | 0.47 | 0.001–0005 | 575,000 |
| 7 | titanium oxide | tungsten sulfide | 30 | 3.0:1 | 0.59 | 0.001–0.005 | 600,000 |
| 8 | titanium oxide | tungsten sulfide | 35 | 3.5:1 | 0.40 | 0.001–0.005 | 625,000 |
| 9 | titanium oxide | bismuth telluride | 25 | 2.5:1 | 0.59 | 0.001–0.004 | 350,000 |
| 10 | titanium oxide | bismuth telluride | 30 | 3.0:1 | 0.54 | 0.001–0.004 | 362,500 |
| 11 | titanium oxide | bismuth telluride | 35 | 3.5:1 | 0.55 | 0.001–0.004 | 312,500 |

Although the average shown in Table 2 range from 350,000 to 635,000 cycles, in each of Examples 6–11, 1,000,000 sliding cycles were made at 750° F. (399° C.).

The variable stator vane assembly of the present invention having the wear coating 360, 460 antifriction coating 370, 470 and the bushing system opposed surface combination preferably also is resistant to wear over the entire operating temperature range of the vane 350, 450. In one embodiment of the present invention, the opposed surfaces wear less than about 0.005 inches after at least 500,000 reciprocations (i.e., cycles). In another embodiment, the wear coating 360, 460 and antifriction coating 370, 470 combination according to the present invention results in wear to the vane assembly of less than about 0.005 inches over 2 million reciprocations (i.e., cycles) at temperatures up to about 800° F. Where each cycle or reciprocation comprises one movement in the reciprocating back and forth motion.

The variable stator vane assembly of the present invention having the wear coating 360, 460 and antifriction coating 370, 470 combination preferably maintains a friction coefficient between the sliding surfaces at or below about 0.6 over the entire operating range of vane 350, 450. More preferably, the variable stator vane assembly of the present invention maintains a friction coefficient between the sliding surfaces of below about 0.5 over the entire operating range of vane 350, 450. In particular, the antifriction coating 370, 470 of the present invention preferably maintains a coefficient of friction of less than about 0.5 when in contact with the surface of the wear coating or the surface of the bushing system in a reciprocating motion under a load at temperatures up to 800° F. (427° C.).

In another embodiment of the present invention, additives may be included in the antifriction coating 370, 470 to provide additional desirable properties for the coating. The additional additive is an additive that provides desirable properties, such as increased lubricity, increased adhesion, or increased coating uniformity, to the composition. Suitable additional additives include, but are not limited to, polytetrafluoroethylene, adhesion promoters, dispersing agents and combinations thereof. Examples of additional additives include graphite, molybdenum sulfide, molybdenum diselenide and copper.

The variable stator vane bushing and seal materials set forth in the best mode of practicing the present invention more than double the wear life in the engine systems in which they are used. The combination of the wear coating 360, 460 and antifriction coating 370, 470 of the present invention assure reduced coefficients of friction, in the range of about 0.2 to about 0.6, over the life of the system. This is significant, as some conventional gas turbine engine systems have been designed to accommodate coefficients of friction as high as about 0.95, which occur as bushing and wear materials deteriorate during normal engine operation. Improvements in coefficient of friction permit the reduction in size, and hence weight of the actuation mechanism of the variable guide vanes, including the lever arms. Although the above embodiment have been described with respect to a variable stator vane bushing arrangement, the coating system of the present invention may be used with any sliding surfaces that require lubrication. The coating system of the present invention is particularly useful for sliding application that are exposed to higher temperatures, including temperatures from about 400° F. (204° C.) up to about 1200° F. (649° C.) and atmospheres of substantially devoid of water vapor. The antifriction coating 370, 470 preferably maintains a coefficient off friction between the opposed surfaces of less than about 0.95 at temperatures greater than about 400° F. and/or devoid of water vapor for at least 500,000 reciprocations.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A variable stator vane assembly for use in a compressor section of a turbine engine, comprising:
    a plurality of movable metallic stator vanes;
    a metallic stator casing supporting the vanes;
    a bushing system positioned between the stator vanes and the stator casings, the bushing system comprising a ceramic bushing, the ceramic bushing selected from the group of ceramic materials consisting of silicon nitride, tungsten carbide and zirconium oxide; and
    at least a portion of the ceramic bushing comprising a closed pore porosity and an elastic modulus of less than the elastic modulus of a substantially identical non-porous ceramic material.

2. The stator vane assembly of claim 1, the bushing system further comprises:
    a first end, a second end and a seal tube portion intermediate between the first end and the second end;
    the first end, the second end and the seal tube portion each comprising a ceramic material selected from the group consisting of silicon nitride, tungsten carbide and zirconium oxide, and
    the seal tube comprising the portion of the ceramic bushing having a closed pore porosity.

3. The stator vane assembly of claim 2 wherein the first end of the bushing system is a flanged section attached to a straight section, wherein the straight section extends into the casing opening and between the vane and the casing, and the flanged section is positioned in the first recessed portion of the casing.

4. The stator assembly of claim 2 wherein the first end of the bushing system further comprises a straight section and a washer, wherein the straight section extends into casing opening and between the vane and the casing and the washer is positioned in the first recessed portion of the casing.

5. The stator vane assembly of claim 2 wherein the second end of the bushing system is a flanged section.

6. The stator assembly of claim 2 wherein the second end of the bushing system comprises a straight section and a washer.

7. The stator vane assembly of claim 2 wherein the porous ceramic seal tube comprises a closed pore porosity of from about 10% to about 35% by volume.

8. The stator vane assembly of claim 7 wherein the porous ceramic seal tube comprises a closed pore porosity of about 20% by volume.

9. The stator vane assembly of claim 2 wherein the porous ceramic seal tube has an elastic modulus of the seal tube portion is from about 20% to about 50% less than the elastic modulus of a substantially identical non-porous ceramic material.

10. The stator vane assembly of claim 9 wherein the porous ceramic seal tube has an elastic modulus of the seal tube portion is about 50% less than the elastic modulus of a substantially identical non-porous ceramic material.

11. The stator vane assembly of claim 1 wherein each vane further includes a wear-resistant coating applied to a surface of the vane.

12. The stator assembly of claim 11 wherein the wear resistant coating is selected from the group consisting of tungsten carbide, modified tungsten carbide and titanium nitride.

13. The stator assembly of claim 12 wherein the wear resistant coating is applied to a thickness of from about 0.0002 to about 0.010 inches.

14. The stator assembly of claim 9 further including a antifriction coating applied along the interface between the coated vane and the bushing assembly.

15. The stator assembly of claim 12 wherein the antifriction coating is a titanium oxide binder that further includes a friction modifying agent uniformly dispersed through the coating.

16. The stator assembly of claim 13 wherein the friction modifying agent comprises tungsten disulfide.

17. A variable stator vane assembly for use in a compressor section of a turbine engine, comprising:
    a plurality of movable metallic stator vanes, the vane comprising a wear resistant coating;
    a metallic stator casing supporting the vanes;
    a bushing system positioned between the stator vanes and the stator casings, the bushing system comprising a ceramic bushing, the ceramic bushing selected from the group of ceramic materials consisting of silicon nitride, tungsten carbide and zirconium oxide;
    at least a portion of the ceramic bushing comprising a seal having a closed pore porosity and an elastic modulus of less than the elastic modulus of a substantially identical non-porous ceramic material;
    an antifriction coating is disposed on one or more of the vane and the bushing systems, the antifriction coating includes a titanium oxide binder that further includes a friction modifying agent uniformly dispersed through the coating.

18. The stator vane assembly of claim 17 wherein the porous ceramic seal comprises a closed pore porosity of from about 10% to about 35% by volume.

19. The stator vane assembly of claim 18 wherein the porous ceramic seal comprises a closed pore porosity of about 20% by volume.

20. The stator vane assembly of claim 17 wherein the porous ceramic seal has an elastic modulus of the seal tube portion is from about 20% to about 50% less than the elastic modulus of a substantially identical non-porous ceramic material.

21. The stator vane assembly of claim 20 wherein the porous ceramic seal has an elastic modulus of the seal tube portion is about 50% less than the elastic modulus of a substantially identical non-porous ceramic material.

22. The stator assembly of claim 17 wherein the wear resistant coating is selected from the group consisting of tungsten carbide, modified tungsten carbide and titanium nitride.

23. The stator assembly of claim 22 wherein the wear resistant coating is applied to a thickness of from about 0.0002 to about 0.010 inches.

24. The stator assembly of claim 17 further including an antifriction coating applied on a surface of one or both of the vane and the bushing system.

25. The stator assembly of claim 17 wherein the friction modifying agent comprises tungsten disulfide.

26. A method for fabricating porous ceramic bushings comprising:
- providing a slurry comprising powdered ceramic material;
- mixing the slurry for a time sufficient to provide a substantially uniform slurry composition;
- adding pore forming agent into the mixed slurry;
- mixing the pore forming agent containing slurry to substantially uniformly distribute the pore forming throughout the slurry;
- forming the slurry into a desired geometry;
- sintering the formed slurry to form a porous, sintered product having a near-net shape having a reduced or eliminated amount of machining; and
- wherein the porous, sintered product has an elastic modulus of from about 20% to about 50% of the elastic modulus of a substantially identical non-porous ceramic material.

27. The method according to claim 26, wherein the powdered ceramic material is selected from the group consisting of silicon nitride, tungsten carbide and zirconium oxide.

28. The method according to claim 26, wherein the pore forming agent is a material selected from the group consisting of polymer spheres, glass spheres, ceramic spheres and blowing agents.

29. The method according to claim 26, wherein the slurry comprises from about 40 to about 60% solids by weight.

30. The method according to claim 26, wherein the porous, sintered product having near-net shape requires the removal of less than about 0.025 inches of material prior to installation into a gas turbine engine.

31. The method according to claim 26, wherein the porous, sintered product having near-net shape requires the removal of less than about 0.010 inches of material prior to installation into a gas turbine engine.

32. The method according to claim 26, wherein the desired geometry is a bushing for a gas turbine engine component.

* * * * *